(12) United States Patent
Ide et al.

(10) Patent No.: US 9,958,679 B2
(45) Date of Patent: May 1, 2018

(54) ELECTRO-OPTICAL DEVICE HAVING OPTICAL ELEMENT INCLUDING A PLURALITY OF LIGHT GUIDING MATERIALS BONDED VIA A HALF MIRROR LAYER

(71) Applicant: Seiko Epson Corporation, Tokyo (JP)

(72) Inventors: Mitsutaka Ide, Shiojiri (JP); Masatoshi Yonekubo, Hara-mura (JP); Takashi Takeda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 29 days.

(21) Appl. No.: 14/658,344

(22) Filed: Mar. 16, 2015

(65) Prior Publication Data

US 2015/0277124 A1 Oct. 1, 2015

(30) Foreign Application Priority Data

Mar. 28, 2014 (JP) ................................. 2014-068231

(51) Int. Cl.
*G02B 27/01* (2006.01)
*G02B 27/30* (2006.01)

(52) U.S. Cl.
CPC ..... *G02B 27/0172* (2013.01); *G02B 27/0101* (2013.01); *G02B 27/30* (2013.01);
(Continued)

(58) Field of Classification Search
CPC .......... G02B 27/0172; G02B 2027/011; G02B 2027/0178; G02B 5/30; G02B 17/086; G02B 27/0101; G02B 2027/0134; G02B 2027/0125; G02B 2027/012; G02B 2027/0132; G02B 2027/0123; G02B 27/30
(Continued)

(56) References Cited

U.S. PATENT DOCUMENTS

| 8,649,099 B2* | 2/2014 | Schultz ............ B29D 11/00663 359/630 |
| 2007/0188837 A1 | 8/2007 | Shimizu et al. |
| 2011/0075266 A1* | 3/2011 | Oka ................... G02B 27/0172 359/630 |

(Continued)

FOREIGN PATENT DOCUMENTS

| JP | 07-325267 A | 12/1995 |
| JP | 2006-301234 A | 11/2006 |

(Continued)

*Primary Examiner* — William R Alexander
*Assistant Examiner* — Henry Duong
(74) *Attorney, Agent, or Firm* — ALG Intellectual Property, LLC

(57) ABSTRACT

An electro-optical device includes: a light source which generates a light beams having various angle components; and a first optical element includes a plurality of light guiding materials are bonded to each other via a half mirror layer.

The first optical element includes a first surface and a second surface, an incident surface is formed so as to intersect the first surface at a first angle, an emitting surface is formed so as to intersect the first surface at a second angle.

A first part of the light is a light reflected by the second surface, and is incident on the emitting surface. The first optical element is formed so that the first part of the light is reflected by the emitting surface, with angles of the first angle and the second angle, and with a refractive index of the plurality of light guiding materials.

10 Claims, 9 Drawing Sheets

(52) U.S. Cl.
CPC ............... *G02B 2027/012* (2013.01); *G02B 2027/0123* (2013.01); *G02B 2027/0125* (2013.01); *G02B 2027/0132* (2013.01); *G02B 2027/0134* (2013.01)

(58) Field of Classification Search
USPC ........................................... 359/633
See application file for complete search history.

(56) References Cited

U.S. PATENT DOCUMENTS

| | | | | |
|---|---|---|---|---|
| 2011/0234941 | A1* | 9/2011 | Gourlay | G02B 6/0041 349/64 |
| 2012/0206817 | A1* | 8/2012 | Totani | G02B 27/0172 359/633 |
| 2013/0070344 | A1* | 3/2013 | Takeda | G02B 6/0035 359/633 |
| 2013/0083404 | A1* | 4/2013 | Takagi | G02B 27/0101 359/633 |
| 2014/0307197 | A1* | 10/2014 | Moriwaki | G09F 9/30 349/58 |
| 2015/0277125 | A1* | 10/2015 | Hirano | G02B 6/0088 359/633 |
| 2015/0279114 | A1 | 10/2015 | Yonekubo | |
| 2016/0124226 | A1 | 5/2016 | Ide et al. | |
| 2016/0124232 | A1 | 5/2016 | Ide et al. | |

FOREIGN PATENT DOCUMENTS

| | | |
|---|---|---|
| JP | 2007-219106 A | 8/2007 |
| JP | 2016-090801 A | 5/2016 |
| JP | 2016-090802 A | 5/2016 |

\* cited by examiner

θ = 5°

θ = 0°

θ = -5°

ELECTRO-OPTICAL DEVICE HAVING OPTICAL ELEMENT INCLUDING A PLURALITY OF LIGHT GUIDING MATERIALS BONDED VIA A HALF MIRROR LAYER

BACKGROUND

1. Technical Field

The present invention relates to an electro-optical device.

2. Related Art

In recent years, a head mounted display has been receiving attention (for example, refer to JP-A-2007-219106).

In such a head mounted display, when an image is smaller than the diameter of the eyes, it is required that a display position of the image be strictly adjusted to the position of the eyes, and thus, convenience deteriorates. For this reason, it is required that image light be spread so as to be larger than the diameter of the eyes. In addition, in the head mounted display, it is required that light having the same intensity distribution be incident on both the right and the left eye. For this reason, as illustrated in FIG. 12, it is desirable that an emitted beam be uniform and be spread by using a layered body 60 which includes a long plane-parallel plate 61, a half mirror 62, and a total reflection mirror 63.

In addition, an optical element, which causes non-uniform light intensity distribution to be uniform and changes an aspect ratio of the beam, is known (for example, refer to JP-A-7-325267).

However, when the above-described layered body 60 is employed, the emitted beam is discharged in many directions. For this reason, when necessary light is selected and the image light is generated on a light emitting surface side, it is required that an additional light shielding countermeasure be installed at a separated position. For this reason, the configuration of the device becomes unnecessarily large, and thus, there is a problem of contrast ratio deterioration due to stray light which cannot be prevented by increasing the cost or installing the light shielding countermeasure.

Here, it is possible to consider combining the light having an angle distribution, like the image light, with the technology in the above-described JP-A-7-325267. However, since light which is determined in a first direction is assumed to be light which is incident at 45 degrees in the technology of the above-described JP-A-7-325267, the stray light is generated similarly to a case where the above-described layered body is used.

SUMMARY

An advantage of some aspects of the invention is to provide an electro-optical device which is small in size, can suppress deterioration of a contrast ratio, and can emit spread image light.

According to an aspect of the invention, there is provided an electro-optical device including: a light source which generates a light beams, the light beams having various angle components; and a first optical element includes a plurality of light guiding materials, the plurality of light guiding materials are bonded to each other via a half mirror layer. The first optical element includes a first surface, a second surface, an incident surface, and an emitting surface, the first surface is formed so as to be parallel to the half mirror layer, the second surface is formed to be parallel to the first surface, the incident surface is formed so as to intersect the first surface at a first angle, the emitting surface is formed so as to intersect the first surface at a second angle, at a position opposite to the incident surface. The light source is disposed so that the light beams is incident on the incident surface of the first optical element. A first part of the light is a light incident from the incident surface, is guided thereto, reflected by the second surface, and is incident on the emitting surface. The first optical element is formed so that the first part of the light is reflected by the emitting surface, with angles of the first angle and the second angle, and with a refractive index of the plurality of light guiding materials.

In this case, among the light beams from the light source which are incident from the incident surface and is guided thereto, the light which is incident on the emitting surface after being reflected by the second surface is reflected by the emitting surface. Therefore, it is not required that an additional light shielding member be disposed on the emitting surface, and it is possible to realize small size and low cost in the optical element. In addition, it is possible to suppress deterioration of a contrast ratio due to stray light from the emitting surface which cannot be prevented by a light shielding countermeasure.

According to the aspect, the first angle may be an angle which is equivalent to the second angle.

In this configuration, since incident light and emitted light have the same angle with respect to the first surface, it is unlikely that image distortion will occur, and it is easy to optically design the device.

According to the aspect, the refractive index of the plurality of light guiding materials may be 1.5, and the first angle and the second angle may be equal to or less than 66 degrees.

In this configuration, since the light which is incident on the emitting surface after being reflected by the second surface is reflected by the emitting surface, it is possible to suppress generation of the stray light.

According to the aspect, the light source may be disposed so that a light in the first direction among the light beams is vertically incident on the incident surface. Each of a light included in the light beams may intersect the first direction at an angle equal to or less than 10 degrees.

In this configuration, since the light which is incident on the emitting surface after being reflected by the second surface is reflected by the emitting surface, it is possible to suppress generation of the stray light.

According to the aspect, the electro-optical device may further include a reflecting layer on the first surface of the first optical element.

In this configuration, since the image light is reflected by the reflecting layer inside the first optical element, it is possible to reflect the light from the emitting surface with high efficiency.

According to the aspect, a second part of the light is a light incident on the incident surface and is reflected by the half mirror layer, a third part of the light is a light incident on the incident surface and transmits the half mirror layer, and the first optical element may be formed so that the phase of the second part of the light and the phase of the third part of the light are the same phases, with angles of the first angle and the second angle, and with thicknesses of each of the plurality of light guiding materials.

In this configuration, since both the phase of the light which is reflected by the half mirror layer and the phase of the light which transmits the half mirror layer and is reflected by the first surface are obtained, it is possible to suppress the attenuation of light intensity inside the first optical element.

The electro-optical device may further include a second optical element includes a plurality of light guiding materials, the plurality of light guiding materials of the second optical element are bonded to each other via a half mirror layer. The second optical element may be disposed so that the half mirror layer of the second optical element intersects the half mirror layer of the first optical element. A light which is incident on the incident surface of the first optical element may be spread in at least two directions via the first optical element and the second optical element.

In this configuration, it is possible to make a configuration of the device small in size, and to enlarge the light in at least two directions.

According to the aspect, the light source may be provided with a display panel which displays the image and a collimator lens which considers the image displayed by the display panel to be parallel light having the various angle components.

In this configuration, it is possible to display an excellent image in which the contrast ratio deterioration due to the stray light is suppressed.

According to the aspect, the light source may be provided with a light emitting portion which generates a light, and a micromirror which reflects the light from the light emitting portion. The micromirror may consider the light from the light emitting portion which is incident on the micromirror to be the image light which has various angle components, as the light is reflected to be scanned.

In this configuration, since the image light is incident on the light incident surface of the first optical element by scanning the reflected light that is reflected by the micromirror, it is possible to enlarge the image light which has a short full length, and to provide an electro-optical device which can be installed at limited locations by making the configuration of the device small in size.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference the drawings.

In addition, in order to make it easy to understand the characteristics thereof, there is a case where the drawings used in description below are illustrated by enlarging a part which shows the characteristics for the sake of convenience, and the drawings do not necessarily have the same dimensional ratios of each constituent element as the real dimensional ratios.

First Embodiment

Figure 1:
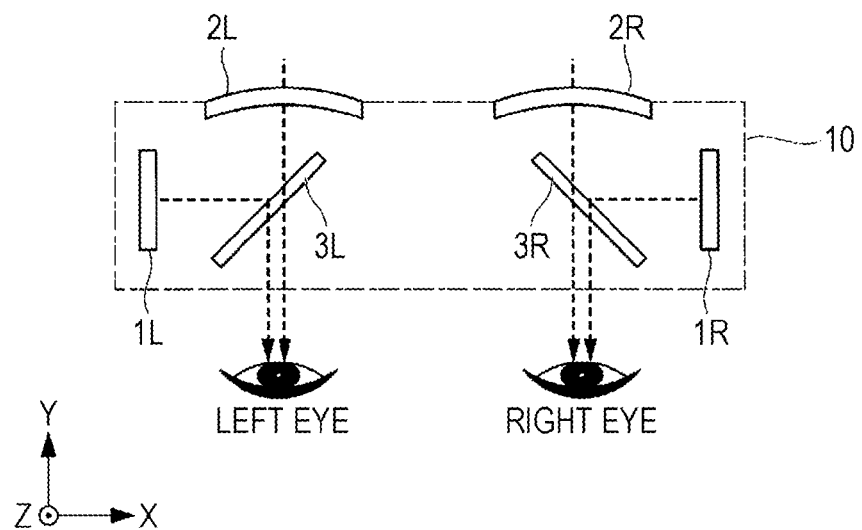
FIG. 1 is a schematic configuration view illustrating a transmission type display device according to a first embodiment.

An electro-optical device (display device) according to the embodiment is a transmission type head mounted display (HMD). FIG. 1 is a schematic configuration view illustrating a transmission type display device according to the embodiment.

Hereinafter, an XYZ coordinate system is used for description of the drawings when necessary. In each drawing, an X direction is defined as an arrangement direction of the eyes of a human who wears the transmission type display device, in other words, a right-and-left direction of a user. A Y direction is defined as a front-and-back direction of the user which is orthogonal to the X direction. The Z direction is defined as a vertical direction which is a direction orthogonal to an XZ direction.

As illustrated in FIG. 1, a display device 10 according to the embodiment is an image display device which can project an image toward the eyes when the display device 10 is mounted on the head of the human, and which is provided with a transmission portion (lens) 2L that is overlapped with the left eye of the user, a transmission portion 2L that is overlapped with the right eye of the user, a light emitting device 1L for the left eye, a half mirror (light guiding optical system) 3L for the left eye, a light emitting device 1R for the right eye, and a half mirror (light guiding optical system) 3R for the right eye.

The light emitting device 1L and the light emitting device 1R are disposed so that the emitted light moves forward in opposite directions. The half mirror 3L for the left eye causes the transmitted light of the transmission portion 2L to be transmitted to the left eye side of the user, and reflects the emitted light from the light emitting device 1L to the left eye of the user. Similarly, the half mirror 3R for the right eye causes the transmitted light of the transmission portion 2R to be transmitted to the right eye side of the user, and reflects the emitting light from the light emitting device 1R to the right eye of the user.

Therefore, the user perceives an image which is overlapped by an image which is observed via the transmission portion 2L and the transmission portion 2R and a display image from each of the light emitting devices 1L and 1R. In this manner, via a light guiding portion (the transmission portion 2L and the transmission portion 2R), the user can see (observe) an image of an display object displayed by the display device 10 and an external image at the same time, and can visually confirm a virtual image.

In addition, by displaying stereoscopic images (an image for the left eye and an image for the right eye) which are each given parallax by the light emitting device 1L and the light emitting device 1R, the user can perceive a stereoscopic effect in the display image.

The light emitting devices 1R and 1L have the same structure, other than that used when generating images for the right eye and the left eye. For this reason, hereinafter, the light emitting device 1R will be described as an example of the structure.

Figure 2:
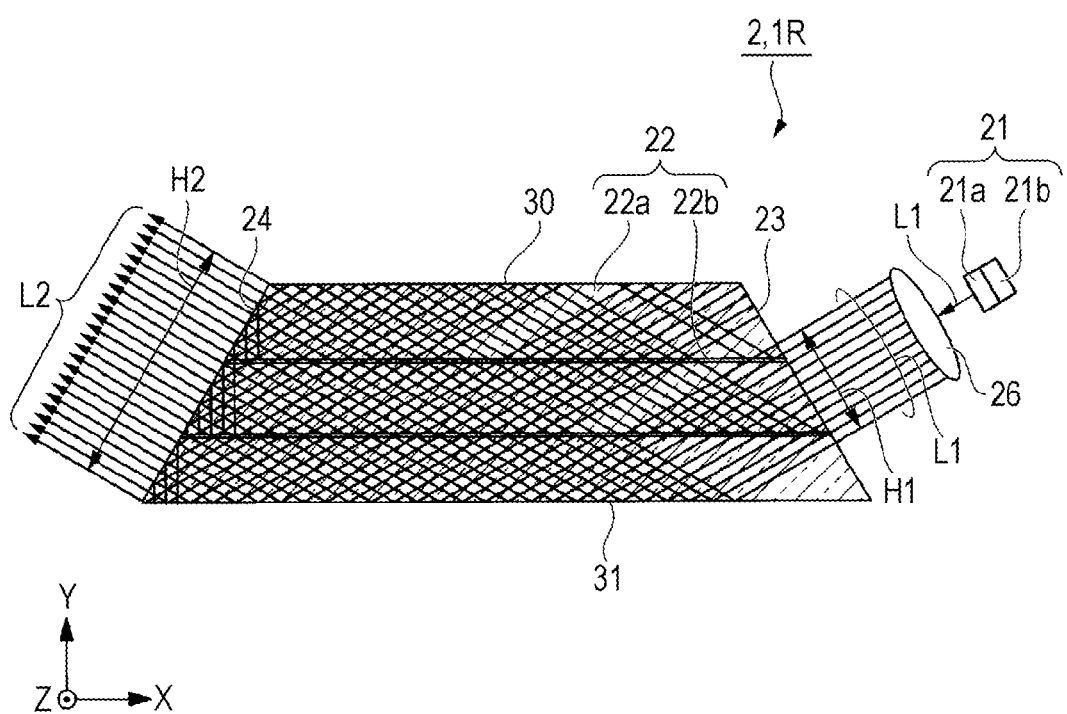
FIG. 2 is a view illustrating a schematic configuration of an image generating device.

FIG. 2 is a view illustrating a schematic configuration of an image generating device (image generating portion) 2 which constitutes the light emitting device 1R. As illustrated in FIG. 2, the image generating device 2 includes a display panel 21, a collimator lens 26, and an optical element 22.

In the embodiment, the display panel 21 includes a back light 21b and an optical modulator 21a. The back light 21b is configured of an assembly of the light sources for emitted light of each color, such as red, green, and blue. As each light source, it is possible to use, for example, a light emitting diode (LED) or a laser light source. As the optical modulator 21a, it is possible to use, for example, a liquid crystal display device which is a display element.

Furthermore, as the display panel 21, it is possible to employ a generally known image display device, such as an organic electro-luminescence device (organic EL device) or a scanning type image display device including a scanning optical system which includes the laser light source and a MEMS mirror and scans laser light.

The collimator lens 26 is configured of, for example, a group of projection lenses which projects the input image light, projects image light L1 emitted from the optical modulator 21a of the display panel 21, and makes the light exhibit luminous flux in a parallel state. The image light L1 from the collimator lens 26 has various angle components.

Figure 3:
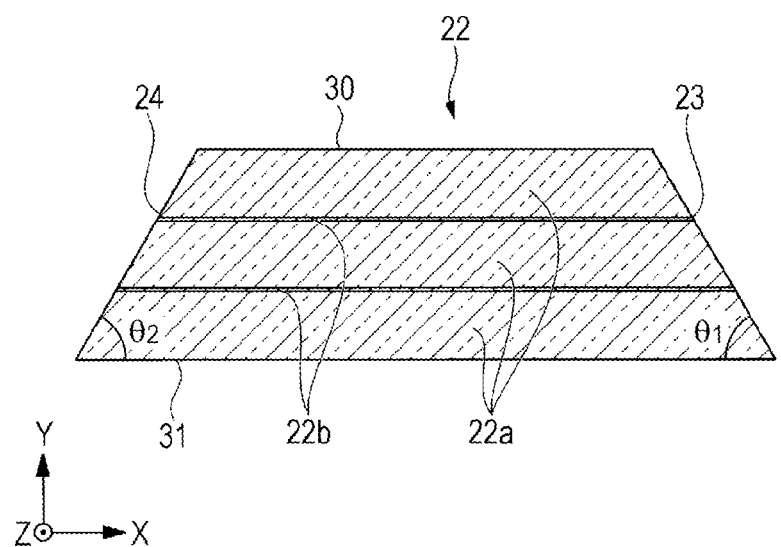
FIG. 3 is an enlarged view of a main part illustrating a schematic configuration of an optical element.

FIG. 3 is an enlarged view of a main part illustrating a schematic configuration of the optical element 22.

As illustrated in FIG. 3, the optical element 22 includes a plurality of plane-parallel plates (light guiding material) 22a and a plurality of half mirrors (half mirror layers) 22b. The plurality of plane-parallel plates 22a are bonded to each other via the half mirrors 22b.

In the embodiment, the optical element 22 is configured by bonding three plane-parallel plates having 0.6 mm of thickness via two half mirrors 22b, and the center length (length in the X direction in a central portion) thereof is 5 mm. In the optical element 22, a pair of end surfaces is cut to be inclined with respect to a thickness direction (Y direction in FIG. 3) of the plane-parallel plates 22a, and each end surface constitutes an incident surface 23 which causes the image light L1 from each of the display panels 21 to be incident and an emitting surface 24 which emits the image light L1.

In the embodiment, an angle $\theta_1$ of the incident surface 23, an angle $\theta_2$ of the emitting surface 24, and a refractive index of the plurality of plane-parallel plates 22a of the optical element 22, are the angles and refractive index in which the light which is incident on the emitting surface 24 after being reflected by an upper surface (second surface) 30, among each of the light beams from the display panel 21 which is incident from the incident surface 23, is reflected by the emitting surface 24. Specifically, a material which causes the image light L1 from the display panel 21 to be incident on the incident surface 23 of the optical element 22 at ±10 degrees and has a refractive index of 1.51 on the plane-parallel plates 22a is used.

Based on a formula (1) described below, in the optical element 22, an end portion is cut so that the angle $\theta_1$ with respect to a bottom surface (first surface) 31 of the incident surface 23 is set to be equal to or less than 66 degrees, and the angle $\theta_2$ with respect to the bottom surface 31 of the emitting surface 24 is set to be equal to or less than 66 degrees. Accordingly, generation of the stray light is prevented.

In other words, in the embodiment, each of the angles of the incident surface 23 and the emitting surface 24 with respect to the bottom surface 31 is the same. In this manner, the optical element 22 has a trapezoidal shape when viewed from a planar view from the Z direction. According to this, since the angles of the incident light and the emitted light are the same with respect to the incident surface 23, image distortion is unlikely to be generated, and it is easy to optically design the device. In addition, the angles of the incident surface 23 and the emitting surface 24 with respect to the bottom surface 31 may not be the same as each other, and any one angle may be larger or smaller than the other angle.

In addition, in the embodiment, all of the three plane-parallel plates 22a are set to have the same thickness, but the thicknesses of all of the plane-parallel plates 22a may be different from each other.

In other words, the thickness (length in the Y direction in FIG. 3) of the optical element 22 and the length (length in the X direction in FIG. 3) of the plane-parallel plate 22a may be set to a value which is sufficient to uniformly distribute the image light L1 on the emitting surface 24.

The optical element 22 functions as a total reflection surface by causing the light to be incident at equal to or less than a critical angle on the bottom surface 31 and the upper surface 30 which are side surface portions other than the incident surface 23 and the emitting surface 24. In addition, in the optical element 22, a reflection layer may be formed on the bottom surface 31 and the upper surface 30 which are the side surface portions other than the incident surface 23 and the emitting surface 24. In this case, the reflection layer is configured by having polishing or reflecting treatment performed thereon. Accordingly, since the image light is reflected by the upper surface 30 and the bottom surface 31, the image light is confined to the inside of the optical element 22.

In the embodiment, a cutting angle (angle $\theta_2$ with respect to the bottom surface 31) of the emitting surface 24 and an incident ray with respect to the incident surface 23 are designed to satisfy a relationship of the following formula (1). In addition, in the formula (1), $\alpha_1$ is an incidence angle of the light with respect to the incident surface 23.

$$\theta_2 < 180 \pm \sin^{-1}\frac{n_1 \sin\alpha_1}{n_2} - \theta_1 - \sin^{-1}\frac{n_1}{n_2} \quad (1)$$

Figure 4:
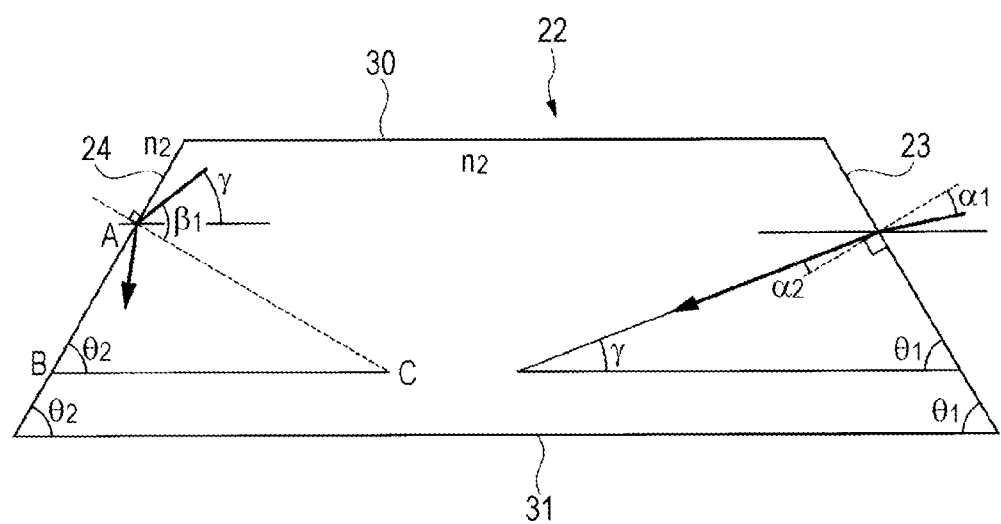
FIG. 4 is a view illustrating a design condition of the optical element.

Here, the above-described formula (1) will be described with reference to the drawings. FIG. 4 is a view illustrating a design condition of the optical element 22.

First, regarding the emitting surface 24, the cutting angle ($\theta_2$) is obtained.

In this case, a condition of the critical angle satisfies the following formula (2), and total reflection is performed.

$$\beta_1 > \sin^{-1}\frac{n_1}{n_2} \quad (2)$$

Regarding an angle $\beta_1$ which is incident on the emitting surface 24, an angle of an angle portion C is (90−$\theta_2$), from a triangle ABC in FIG. 4. In addition, an incidence angle $\beta_1$ is defined as ((angle of angle portion C)+angle γ). In other words, the incidence angle $\beta_1$ is defined in the following formula (3).

$$\beta_1 = 90 - \theta_2 + \gamma \quad (3)$$

A cutting angle ($\theta_2$) of the emitting surface 24 when the total reflection is performed is defined in the following formula (4) according to the above formulas (2) and (3).

$$90 + \gamma - \sin^{-1}\frac{n_1}{n_2} > \theta_2 \quad (4)$$

Next, regarding the incident surface 23, a value of an angle γ is obtained according to a Snell's law which is defined in the formula (5) described below.

$$n_1 \sin \alpha_1 = n_2 \sin \alpha_2 \quad (5)$$

The angle γ in which a ray incident on the inside of the optical element is incident on a film is defined by γ=180−(90+α$_2$)−θ$_1$=90−α$_2$−θ$_1$ (formula (6)). In addition, as illustrated in FIG. 4, when the incidence angle of the ray is opposite, the angle γ is defined by γ=180−(90−α$_2$)−θ$_1$=90+α$_2$−θ$_1$ (formula (7)).

Then, by combining the formula (6) and the formula (7), γ=90±α$_2$−θ$_1$ (formula (8)) is obtained.

As described above, regarding a relationship between the cutting angle (θ$_2$) of the emitting surface 24 which causes the total reflection and the incident ray which is incident on the incident surface 23, the following formula (9) is defined by the above-described formula (4) and the above-described formula (8).

$$\theta_2 < 180 \pm \alpha_2 - \theta_1 - \sin^{-1}\frac{n_1}{n_2} > \theta_2 \quad (9)$$

By adding an incidence condition (α$_2$ which is derived from the above-described formula (5)), the above-described formula (9) is derived.

Here, under a condition in which θ$_1$=θ$_2$, a refractive index outside an element n$_1$=1.0, a refractive index inside an element n$_2$=1.51452, the number of plane-parallel plates 22a=5, a thickness of plane-parallel plate 22a=0.6 mm, the incident angle of the light source (image light) is 0 degrees or ±10 degrees, and a simulation was performed.

In this case, the above-described formula (1) is 2θ$_1$<180±sin$^{-1}$(0.114655)−sin$^{-1}$(0.660275202). When arranging this, if the angle θ$_1$ is equal to or less than 66 degrees, it is possible to confirm that the incident light of ±10 degrees causes the total reflection.

According to the embodiment, in the image light L1, some of components transmits the half mirrors 22b, and the remaining components are reflected. The image light L1 is branched into a plurality of light fluxes by repeating transmission and reflection with respect to the half mirrors 22b, and only a predetermined angle component is emitted from the entire area of the emitting surface 24.

In the embodiment, in the optical element 22, the angle θ$_1$ of the incident surface 23, the angle θ$_2$ of the emitting surface 24, and the refractive index of the plurality of plane-parallel plates 22a are the angles specified and the refractive index with which the light which is incident on the emitting surface 24 after being reflected by the upper surface 30, among each of the light beams from the display panel 21 which is incident from the incident surface 23 and is guided thereto, is reflected by the emitting surface 24. For this reason, since the light which is incident on the emitting surface 24 after being reflected by the upper surface 30 is reflected by the emitting surface 24, generation of the stray light is suppressed when the light other than the predetermined angle components is emitted from the emitting surface 24.

In this manner, in the optical element 22, image light L2 is emitted from the emitting surface 24 when the image light L1 which is incident from the incident surface 23 repeats transmission and reflection in the optical element 22. Width H2 of the image light L2 which is emitted from the emitting surface 24 is spread in a one-dimensional direction within an XY plane so as to be larger than width H1 of the image light L1 which is incident on the incident surface 23.

In the image light L1, the incidence angle with respect to the incident surface 23 matches the emitting angle from the emitting surface 24. In other words, the image light L1 which is vertically incident on the incident surface 23 is vertically emitted from the emitting surface 24, and the image light L1 which is incident on the incident surface 23 having a predetermined inclination is emitted in a direction having a predetermined inclination from the emitting surface 24.

In addition, in a state of maintaining the incidence angle of the image light L1 with respect to the incident surface 23, the optical element 22 can emit the image light L2 from the emitting surface 24 in a predetermined direction.

As illustrated above, according to the embodiment, by repeating transmission and reflection of the image light L1 inside the element, it is possible to emit the image light L2 of which the width is spread in the one-dimensional direction so as to be larger than the width when the light is incident, from the emitting surface 24.

In addition, since generation of the stray light is suppressed on the emitting surface 24, it is not necessary for the additional light shielding member to be provided on the emitting surface 24 side. Therefore, in the optical element 22, small size and low cost are realized. Accordingly, due to the display device 10 which is provided with the optical element 22, the size of the device becomes small and the cost becomes low.

Second Embodiment

Figure 5:
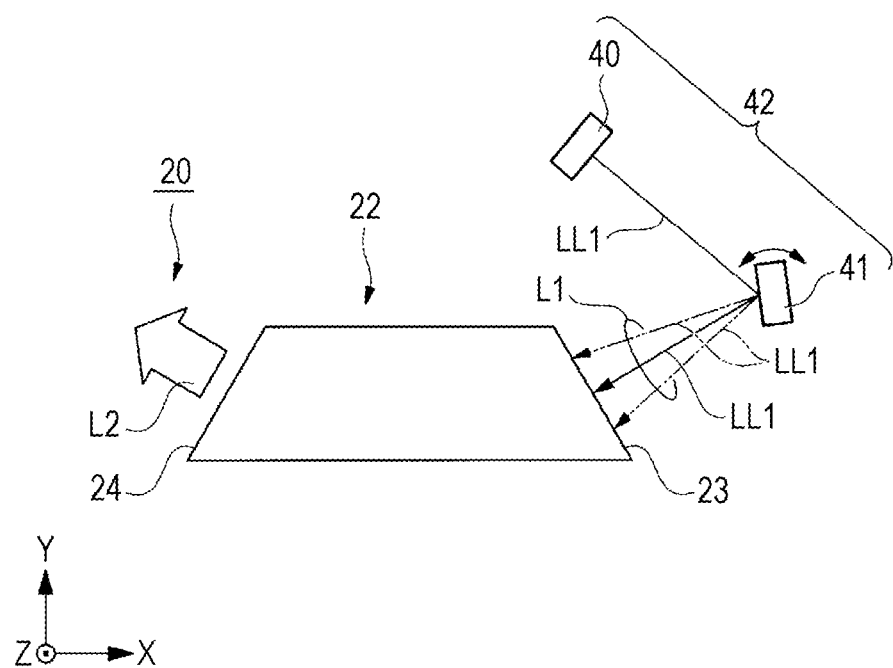
FIG. 5 is a schematic configuration view of a light source device according to a second embodiment.

Next, an image generating device according to a second embodiment will be described. FIG. 5 is a schematic configuration view of the image generating device according to the embodiment. The difference between the embodiment and the first embodiment is the method of generating the image light L1, and otherwise the configurations are the same. Therefore, in the description below, the same configurations as in the first embodiment are given the same reference numerals, and detailed description thereof will be omitted.

As illustrated in FIG. 5, an image generating device 20 according to the embodiment includes a light emitting portion 42 and the optical element 22. The light emitting portion 42 includes a light source 40 and a MEMS mirror (micromirror) 41. In the embodiment, the light source 40 is configured of one laser light source which emits a laser light LL1. The MEMS mirror 41 is a micromirror which causes the laser light LL1 to be incident on the incident surface 23 by reflecting the laser light LL1. The MEMS mirror 41 forms the image light L1 which is made of a plurality of laser light LL1 which is incident on the incident surface 23 in order, by scanning the laser light LL1 on the incident surface 23.

In this manner, in the embodiment, the image light L1 is configured as the MEMS mirror 41 scans the laser light LL1. For this reason, the image light L1 is incident on the incident surface 23 in a state of having a predetermined amplitude (oscillation angle). In the embodiment, the amplitude of the image light L1 is set to be 10°.

Figure 6A:
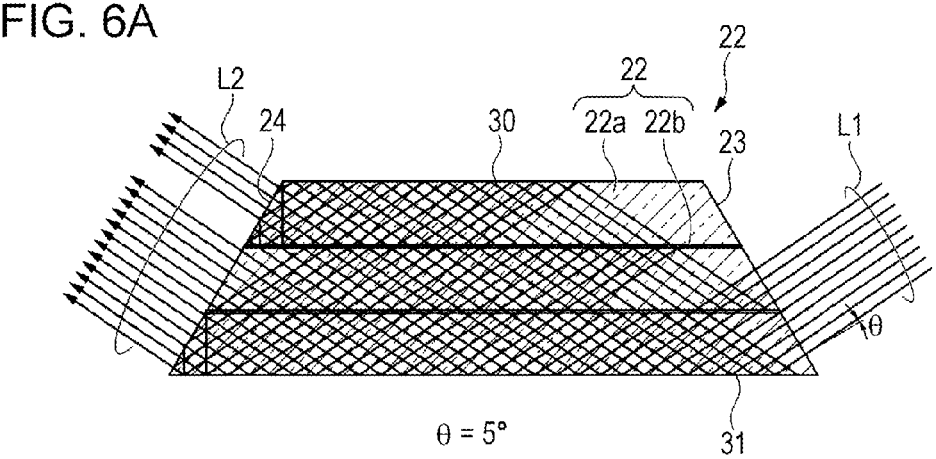
FIGS. 6A, 6B, and 6C are views illustrating an incident angle of image light.
Figure 6B:
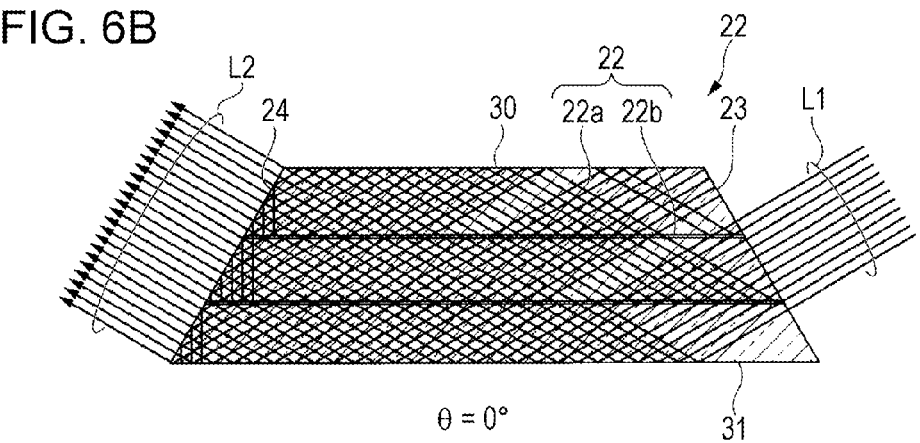
Figure 6C:
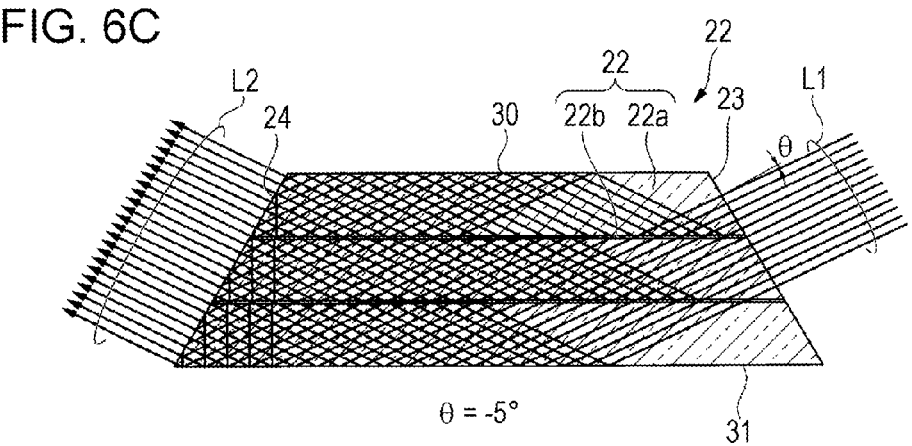

FIGS. 6A, 6B, and 6C are views illustrating an amplitude of the incident angle with respect to the incident surface 23 in the image light L1. FIG. 6A is a view illustrating a case where the incident angle θ of a main ray of the image light L1 is 5° with respect to the incident surface 23. FIG. 6B is a view illustrating a case where the incident angle θ of the main ray of the image light L1 is 0° with respect to the incident surface 23. FIG. 6C is a view illustrating a case where the incident the incident angle θ of the main ray of the image light L1 is −5° with respect to the incident surface 23.

In the embodiment, when the main ray of the image light L1 is oscillated to the outermost side (in a state of being oscillated by ±5° as illustrated in FIGS. 6A and 6B), the MEMS mirror 41 is controlled so that the plurality of laser light LL1 which constitutes the image light L1 is reliably incident on the incident surface 23. Accordingly, since the image light L1 is reliably incident on the incident surface 23 of the optical element 22, it is possible to use the laser light LL1 which is emitted from the display panel 21 as the image light L1 with high efficiency.

According to the image generating device 20 of the embodiment, it is possible to cause the image light L1 to be incident on the incident surface 23 of the optical element 22 by scanning the reflected light with the MEMS mirror 41. For this reason, it is possible to generate the image light L2 after enlarging the short total length, and to install the device at a limited location by making the configuration of the device small in size.

Next, a modification example of the optical element will be described with reference to FIGS. 7 to 11.

Figure 7:
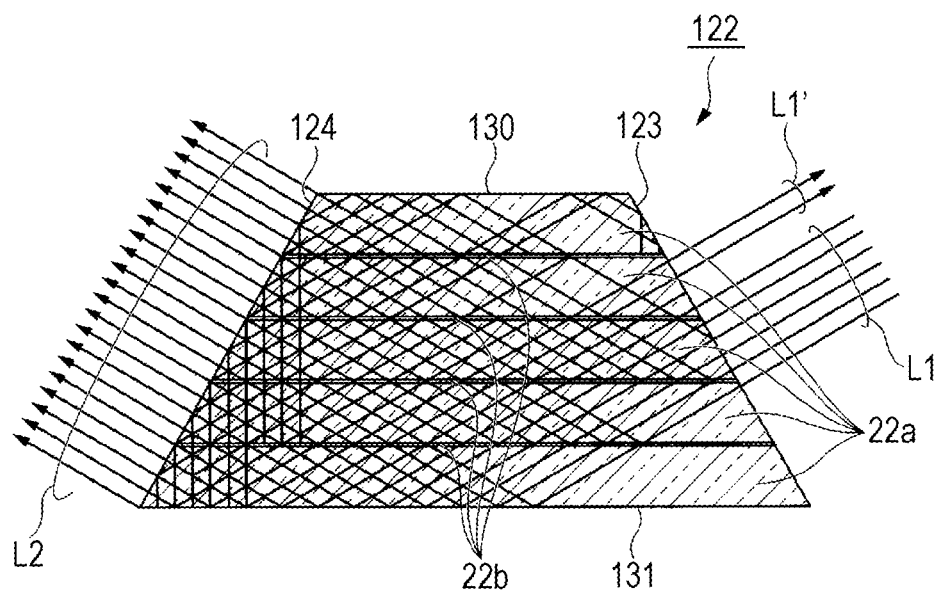
FIG. 7 is a view illustrating return light.

The number of the plane-parallel plates 22a used is not limited to three as in the above-described embodiments. For example, it is possible to appropriately increase or decrease the number of plane-parallel plates 22a used according to a condition, such as an incidence position of the image light L1 or a spot diameter of the light that is incident. FIG. 7 is a view illustrating a configuration of an optical element 122 when the number of the plane-parallel plates 22a increases to five. As illustrated in FIG. 7, the optical element 122 includes five plane-parallel plates (light guiding materials) 122a and four half mirrors (half mirror layers) 122b. In the modification example, the optical element 122 is configured to bond five plane-parallel plates having 0.9 mm of thickness to each other via the four half mirrors 122b, and the center length (length in the X direction in the central portion) thereof is 7 mm.

In addition, even in the modification example, in the optical element 122, an end portion is cut so that an angle θ2 with respect to a bottom surface 131 of an incident surface 123 is set to be 30°, and an angle θ1 with respect to the bottom surface 131 of an emitting surface 124 is set to be 30°.

Meanwhile, there is a concern that the image light L1 which is incident from the incident surface 123 is emitted as return light (stray light) L1' from the incident surface 123 by being reflected several times inside the optical element 122 (refer to FIG. 7). In this case, the contrast ratio of the image light L2 which is emitted from the emitting surface 124 deteriorates.

Figure 8A:
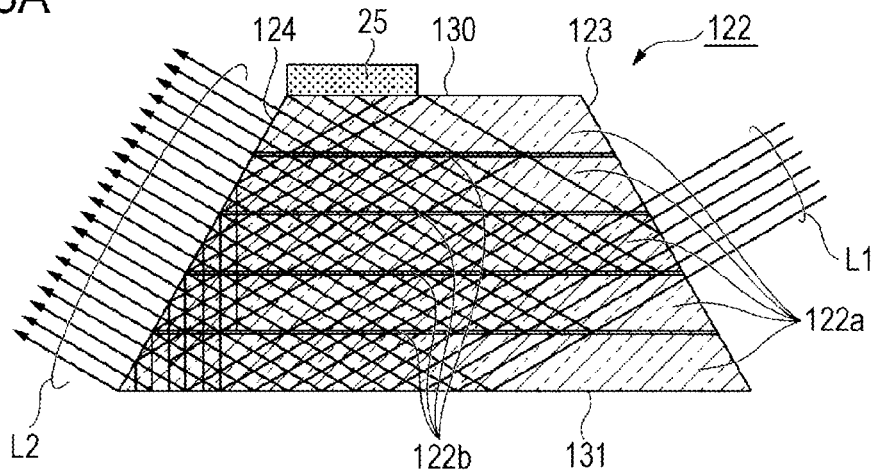
FIGS. 8A to 8C are views illustrating a configuration of the optical element which is provided with a light shielding process layer.
Figure 8B:
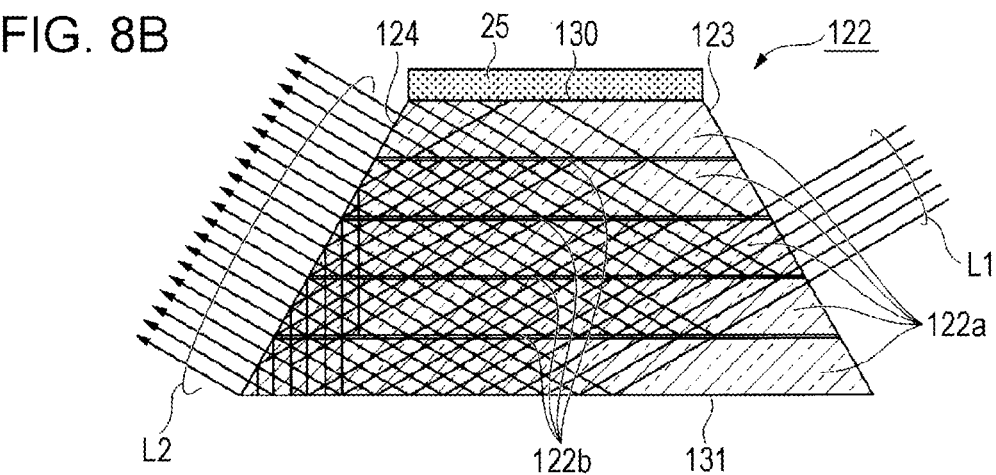
Figure 8C:
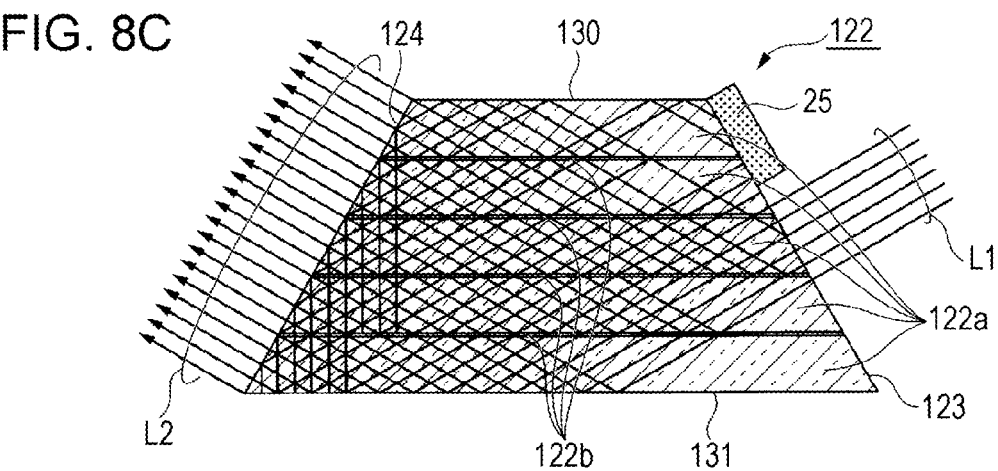

In FIGS. 8A to 8C, a light shielding process layer is disposed at a separated position in order to prevent the return of light which is emitted from the incident surface 123 of the optical element 122 illustrated in FIG. 7.

A light shielding process layer 25 may be disposed at the end portion on the emitting surface 124 side on an upper surface 130 of the optical element 122 as illustrated in FIG. 8A, may be disposed on the entire area of the upper surface 130 of the optical element 122 as illustrated in FIG. 8B, and may be disposed at the end portion on the upper surface 130 side of the incident surface 123 of the optical element 122 as illustrated in FIG. 8C.

According to the optical element 122 which is provided with the light shielding process layer 25 in this manner, the light is suppressed from reflecting multiple times inside the element by the light shielding process layer 25. Accordingly, a part of the image light L1 from the incident surface 123 is not emitted as the return light, and it is possible to prevent deterioration of contrast of the image light L1 which is emitted from the emitting surface 124.

In addition, there is a concern that the light intensity of the image light L1 which passes through the inside of the element and is emitted from the emitting surface 124 is attenuated. This is because the phase is shifted as the image light L1 which is incident on the incident surface 123 is repeatedly transmitted and reflected by the half mirrors (half mirror layers) 22b, or is reflected by the upper surface 130 and the bottom surface 131.

Figure 9:
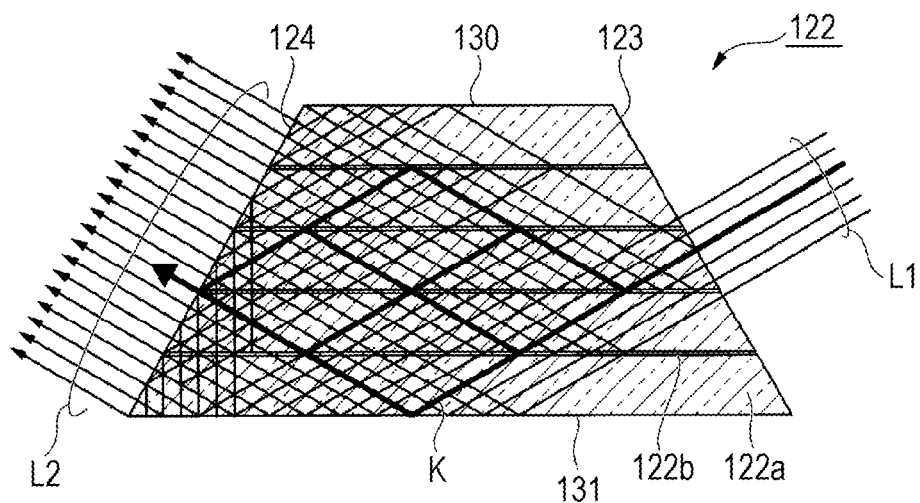
FIG. 9 is a view illustrating an optical path length inside the optical element.
Figure 10:
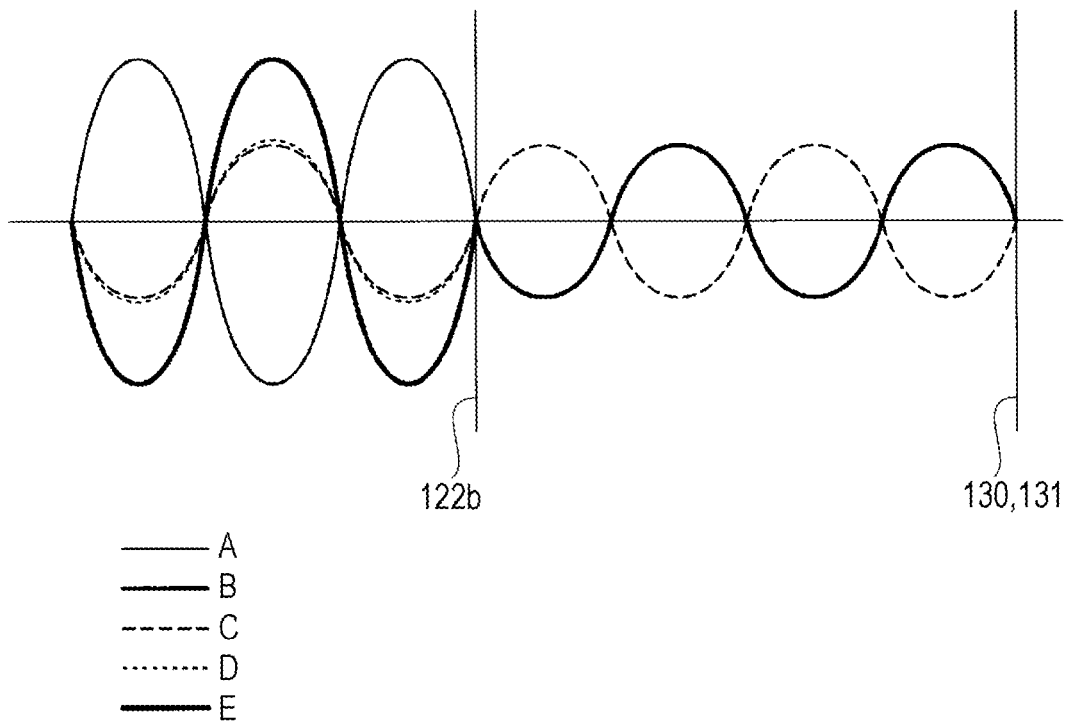
FIG. 10 is a view illustrating a phase difference inside the optical element.

FIG. 9 is a view illustrating an optical path of the image light L1 which is incident on the optical element 122. FIG. 10 is a view illustrating a phase difference of the image light L1. In addition, in FIG. 10, wave form A illustrates a travelling wave inside the optical element 122, wave form B illustrates transmitted light which transmits the half mirrors 122b among the image light L1, wave form C illustrates a first reflected light which is reflected by the upper surface 130 and the bottom surface 131, wave form D illustrates a second reflected light which is reflected by the half mirrors 122b among the image light L1, and wave form E illustrates a combined wave (in other words, a combined wave of the wave forms C and D) of the reflected light which is reflected by the half mirrors 122b and the reflected light which is reflected by the upper surface 130 or the bottom surface 131.

As illustrated in FIG. 9, in the image light L1 which is incident from the incident surface 23 has the same path (light path length) K from the emitting surface 24 before the emission is performed. In the modification example, as illustrated in FIG. 10, the half mirrors 122b, and the upper surface 130 or the bottom surface 131 (reflection layer) are designed to arrange the phase between the first reflected light (first light) which is reflected by the upper surface 130 or the bottom surface 131 and returned after transmitting the half mirrors 122b among the image light L1, and the second reflected light (second light) which is reflected by the half mirrors 122b among the image light L1. Specifically, the thickness of the optical element 22 and the angle of the incident surface 123 are adjusted. For this reason, since attenuation of the intensity does not occur, attenuation of the intensity in the element is suppressed in the image light L1, and the wave form E illustrated in FIG. 10 is excellently emitted from the emitting surface 24.

In the above-described embodiment, a case where the image light L1 is spread only in the one-dimensional direction by disposing one optical element 22 is exemplified, but a plurality of optical elements 22 may be disposed.

Figure 11A:
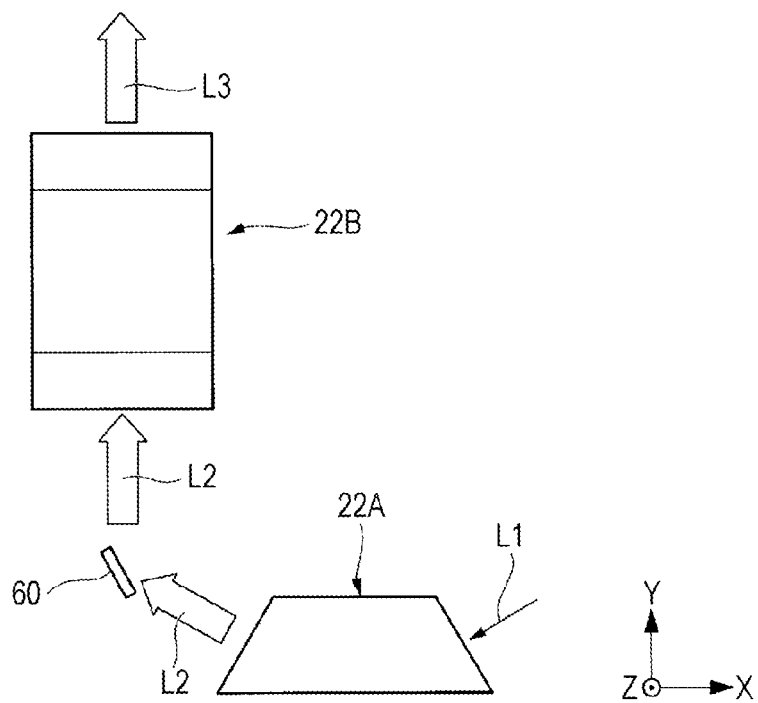
FIGS. 11A and 11B are views illustrating a configuration in which a plurality of optical elements is disposed.
Figure 11B:
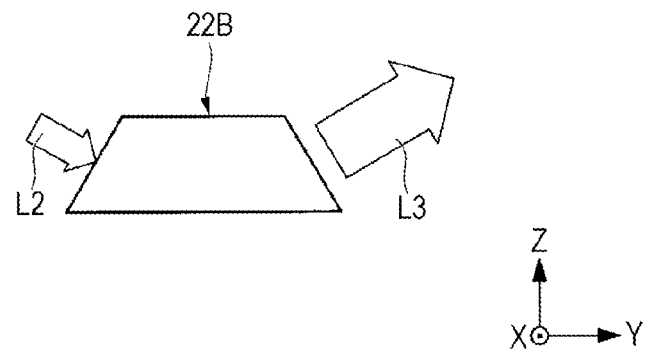
Figure 12:
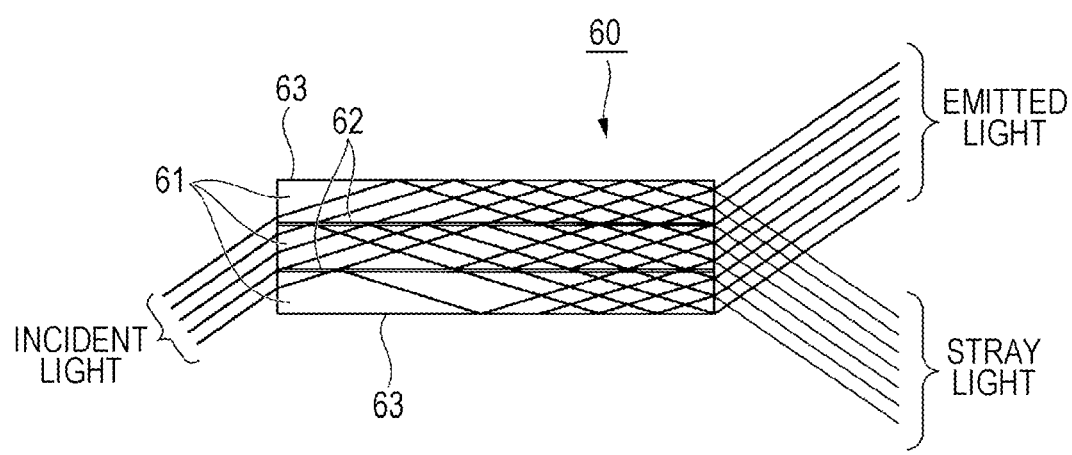
FIG. 12 is a view illustrating a configuration in which a plurality of optical elements is disposed in the related art.

FIG. 11A is a view illustrating a configuration according to the modification example, in which the plurality (two) of optical elements 22 is disposed. FIG. 11B is a view illustrating a state where the image light L1 is spread by the second optical element 22.

In the modification example, as illustrated in FIG. 11A, a first optical element 22A and a second optical element 22B are disposed. The first optical element 22A and the second optical element 22B have the same configuration as that of the optical element 22 in the first embodiment. The first optical element 22A and the second optical element 22B are disposed in the middle of the optical path of the image light L1 so as to have different thickness directions from each other.

Specifically, the first optical element 22A is disposed so that the thickness direction of the plane-parallel plate 22a matches the Y direction in FIG. 11A. Accordingly, the image light L1 is incident from the incident surface 23 of the first optical element 22A, and is emitted from the emitting surface 24 as the image light L2 which is spread in the one-dimensional direction within the XY plane.

Meanwhile, the second optical element 22B is disposed so that the thickness direction of the plane-parallel plate 22a matches the Z direction in FIGS. 11A and 11B. Accordingly, the image light L2 which is spread in the one-dimensional direction within the XY plane is emitted from the emitting surface 24 as image light L3 which is spread in the one-dimensional direction within a YZ plane after being incident from the incident surface 23 of the second optical element 22B.

By disposing the two optical elements 22A and 22B in this manner, it is possible to enlarge the image light L1 in a two-dimensional direction. Accordingly, by appropriately adjusting the number of optical elements, it is possible to easily enlarge the image light L1 to a desired size.

In addition, when the two optical elements are combined with each other, it is preferable to combine the optical elements 22A and 22B in a trapezoidal shape as illustrated in FIG. 10. However, the invention is not limited thereto. In other words, optical elements which are not a trapezoidal shape (for example, in a triangular shape) may be combined with each other, and a combination in which one optical element is a trapezoidal shape and the other optical element is a triangular shape may be employed.

Above, one embodiment and the modification example of the invention are described. However, the invention is not limited to the contents of the above-described embodiments, and it is possible to add various changes without departing from the scope of the invention.

For example, in the above-described embodiment, as an example of the optical elements 22 and 122, an element of which a planar shape is a trapezoidal shape is illustrated. However, the element is not limited thereto, and may be formed in a parallelogram shape or in a polygonal shape other than a square shape by cutting a part in which the image light L1 is incident on or not emitted from the incident surface 23 or the emitting surface 24.

In addition, in the modification example illustrated in FIGS. 11A and 11B, a case where the two optical elements 22A and 22B are disposed is described. However, the number of optical elements is not limited thereto. For example, according to the size of the image light L1 after being spread, three or more optical elements may be disposed. In addition, a case where the elements which have the same plan view shape are used as the two optical elements 22A and 22B is illustrated as an example in FIGS. 11A and 11B. However, different plan view shapes (for example, in which one optical element has a trapezoidal shape and the other optical element has a parallelogram shape) also may be employed. In addition, a case where the image light L1 is spread in the two-dimensional direction is illustrated as an example in FIGS. 11A and 11B. However, the image light L1 may be spread in the one-dimensional direction in two steps.

In addition, the electro-optical device of the invention is not limited to the transmission type head mounted display like in the above-described display device 10, and can be used in a projection type projector which uses an enlarged element or other virtual image displays. In addition to this, as an electronic device which can employ the electro-optical device of the invention, a head-up display or a false window which displays a scenery video within a frame can be employed.

The entire disclosure of Japanese Patent Application No. 2014-068231, filed Mar. 28, 2014 is expressly incorporated by reference herein.

What is claimed is:

1. An electro-optical device, comprising:
    a light source which generates light including light beams, the light beams having various angle components; and
    a first optical element that includes a plurality of light guiding materials, the plurality of light guiding materials are bonded to each other via a half mirror layer,
    wherein
        the first optical element includes a first surface, a second surface, an incident surface, and an emitting surface, which are each exterior surfaces of the first optical element,
        the first surface is formed so as to be parallel to the half mirror layer,
        the second surface is formed so as to be parallel to the first surface,
        the incident surface is formed so as to intersect the first surface at a first angle,
        the emitting surface is formed so as to intersect the first surface at a second angle, at a position opposite to the incident surface,
        the light source is disposed so that the light beams are incident on the incident surface of the first optical element,
        a first part of the light is a light incident from the incident surface that is guided to and reflected by the second surface and is incident on the emitting surface,
        the first optical element is formed so that the first part of the light is reflected by the emitting surface such that the first part of the light does not pass through the emitting surface, and
        the incident surface does not intersect the emitting surface and extends in a different direction than the emitting surface.

2. The electro-optical device according to claim 1, wherein the first angle is an angle which is equivalent to the second angle.

3. The electro-optical device according to claim 2, wherein a refractive index of the plurality of light guiding materials is 1.5, and
    wherein the first angle and the second angle are equal to or less than 66 degrees.

4. The electro-optical device according to claim 1, wherein the light source is disposed so that a light in a first direction among the light beams is vertically incident on the incident surface, and
    wherein each of a light included in the light beams intersects the first direction at an angle equal to or less than 10 degrees.

5. The electro-optical device according to claim 1, further comprising:
    a reflecting layer on the first surface of the first optical element.

6. The electro-optical device according to claim 1, wherein, a second part of the light is a light incident on the incident surface that is reflected by the half mirror layer, and a third part of the light is a light incident on the incident surface that transmits through the half mirror layer, and wherein the first optical element is formed so that a phase of the second part of the light and a phase of the third part of the light are the same phases.

7. The electro-optical device according to claim 1, further comprising:

a second optical element that includes a plurality of light guiding materials, the plurality of light guiding materials of the second optical element are bonded to each other via a half mirror layer, wherein the second optical element is disposed so that the half mirror layer of the second optical element intersects the half mirror layer of the first optical element, and wherein a light which is incident on the incident surface of the first optical element is spread in at least two directions via the first optical element and the second optical element.

8. The electro-optical device according to claim 1, wherein the light source is provided with a display panel which displays the image and a collimator lens which considers the image displayed by the display panel to be parallel light having the various angle components.

9. The electro-optical device according to claim 1, wherein the light source is provided with a light emitting portion which generates a light, and a micromirror which reflects the light from the light emitting portion, and wherein the micromirror considers the light from the light emitting portion which is incident on the micromirror to be the image light which has various angle components, as the light is reflected to be scanned.

10. The electro-optical device according to claim 1, wherein neither the first surface nor the second surface abuts a half mirror layer.

* * * * *